United States Patent [19]

Hutchison

[11] Patent Number: 4,535,958
[45] Date of Patent: Aug. 20, 1985

[54] ALUMINUM COMPOSITE SPAR WING STRUCTURE AND METHOD OF ASSEMBLY

[76] Inventor: Gary A. Hutchison, 207 Plymouth Dr., Charlotte, Mich. 48813

[21] Appl. No.: 448,966

[22] Filed: Dec. 13, 1982

[51] Int. Cl.³ ............................ B64C 1/26; B64C 3/18
[52] U.S. Cl. .................................... 244/123; 244/131; 248/225.1
[58] Field of Search .................. 244/117 R, 119, 123, 244/124, 131; 248/225.1, 223.4; 403/346, 242, 331, 253

[56] References Cited

U.S. PATENT DOCUMENTS

| | | |
|---|---|---|
| 822,226 | 5/1906 | West ................................ 248/223.4 |
| 1,050,530 | 1/1913 | Froberg ............................ 244/124 |
| 1,796,654 | 3/1931 | Hermann ........................... 244/123 |
| 3,176,775 | 4/1965 | Clemens ............................ 244/123 |
| 3,643,900 | 2/1972 | Maloney . | 
| 3,645,481 | 2/1972 | Purdy . |
| 3,935,664 | 2/1976 | Neuhierl ........................... 244/131 |

FOREIGN PATENT DOCUMENTS

| | | | |
|---|---|---|---|
| 747949 | 10/1944 | Fed. Rep. of Germany ...... 244/123 |
| 499183 | 11/1919 | France ................................ 244/123 |
| 888216 | 12/1943 | France ................................ 244/123 |
| 162108 | 4/1921 | United Kingdom ................ 244/123 |
| 212006 | 3/1924 | United Kingdom ................ 244/123 |

Primary Examiner—Galen L. Barefoot
Attorney, Agent, or Firm—Miller, Morriss & Pappas

[57] ABSTRACT

A composite spar wing assembly for use in model aircraft and/or air recreational vehicle construction. The composite spar wing structure is comprised of a composite spar having an I cross-sectional configuration which is adapted for snap engagement with spaced-apart transverse ribs therealong so as to form a wing structure. The composite spar is configured to have an elongate central web portion provided with upper and lower hollow flange members. The composite wing structures are connected to or through an aircraft fuselage by use of elongate spaced-apart connector elements which telescope respectively into the upper and lower hollow flange portions of the composite spar. A fuselage blade box assembly is selectively transversely provided through the fuselage and is provided with a segment of the composite spar so as to selectively receive the connector elements as previously described. A spring lock assembly is selectively provided in association with the aforementioned fuselage blade box assembly and the wing spar elements. The spring lock is configured to lockably engage the upper and lower connector elements inserted into the hollow flange members in contact therewith so as to prevent removal of the connector elements from engagement with the hollow flange portions of the composite spar section mounted in the fuselage blade box assembly and the wing structure. The composite wing spar can be selectively separated into two T-shaped components which are reassembled to form a longitudinally tapered modified wing spar having hollow flanges for use in forming a composite foam core wing structure.

4 Claims, 22 Drawing Figures

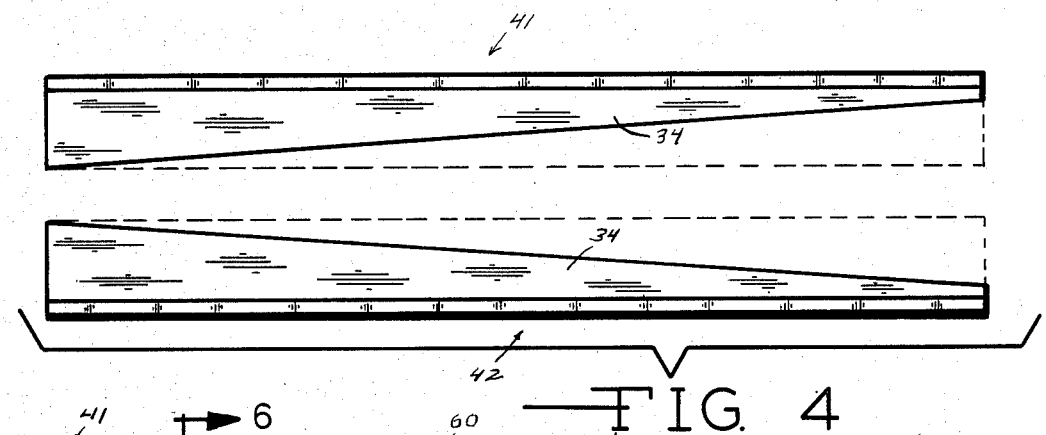
FIG. 4
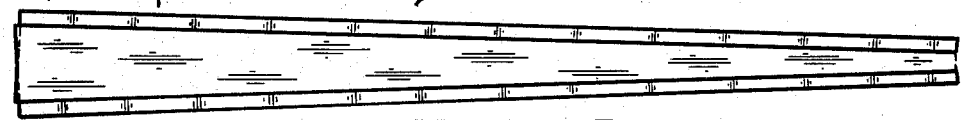
FIG. 5
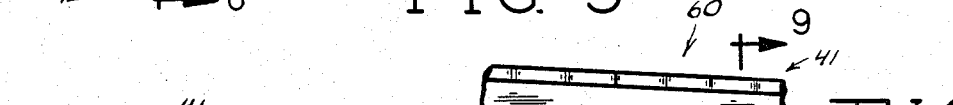
FIG. 8
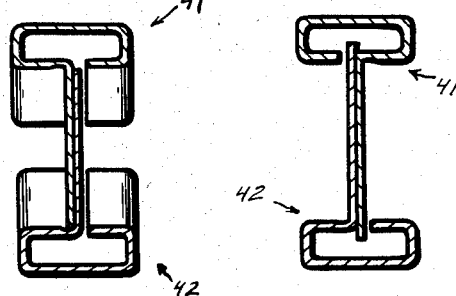
FIG. 6   FIG. 7
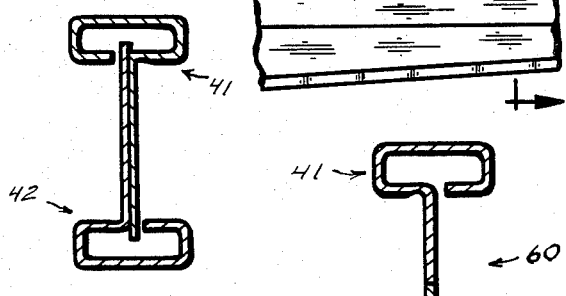
FIG. 9
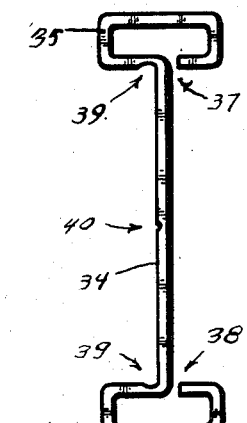
FIG. 10
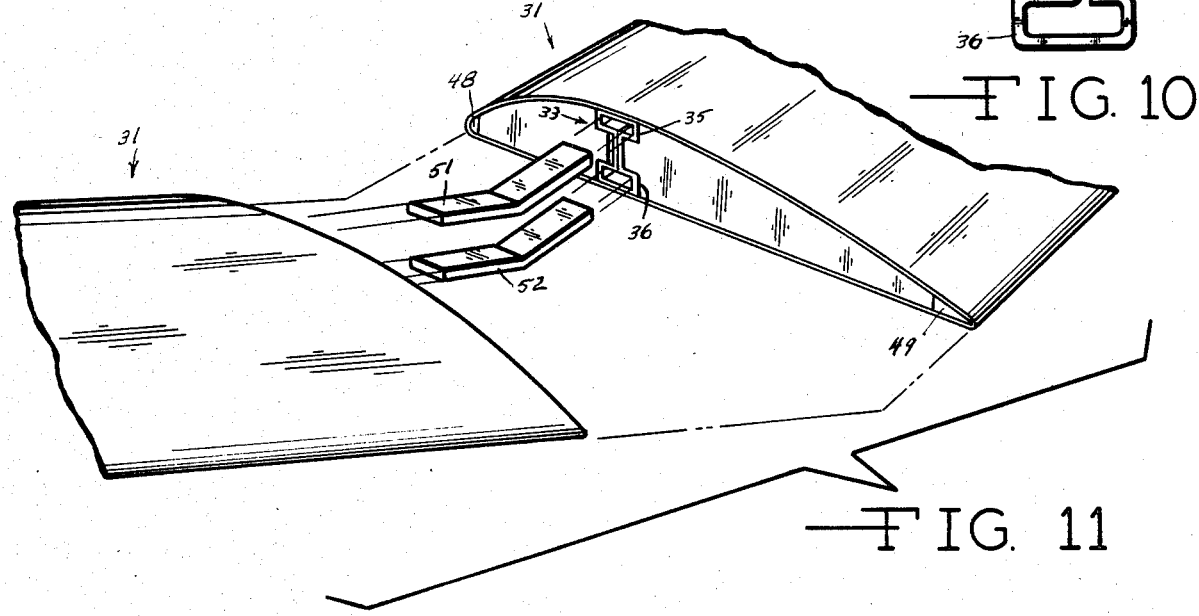
FIG. 11

ALUMINUM COMPOSITE SPAR WING STRUCTURE AND METHOD OF ASSEMBLY

This invention relates to an aluminum composite spar wing structure having an aluminum composite spar member which is comprised of a rolled aluminum member having an I cross-sectional configuration which is adapted for snap engagement with spaced-apart transverse ribs therealong so as to form a wing structure. The rolled aluminum spar is configured to have an elongate central web portion provided with upper and lower hollow flange members having a substantially rectangular hollow cross-sectional configuration.

The upper and lower hollow flanges are further selectively configured to define an elongate slot along the inner portion of each flange member proximate to the web portion of the composite spar.

The elongate slots defined by the hollow flange members cooperate to slidably receive and support rear rib assemblies therein so as to form the wing structure.

Longitudinal snap grooves are selectively provided along the aluminum composite spar at the junctures between the web portion and the upper and lower hollow flange members. The longitudinal snap grooves are positioned along the forward portion of aluminum composite spar and are configured to make snap engagement with spaced-apart front rib assemblies so as to form the wing structure.

The aluminum composite spar member is also selectively provided with an elongate break groove along the central portion of the web portion thereof. As will be hereinafter described, the unitary aluminum composite spar member can be separated into two separate longitudinal T member components. The web portions of the T members can be selectively cut to form complimentary oppositely tapered portions which can be reassembled to form a composite spar member having an elongate longitudinal tapered configuration. Thus assembled, the web portions of the T members can overlap or can be joined in abutting manner to essentially provide a single web member between the oppositely positioned hollow flange portions.

Another embodiment of the invention utilizes the aluminum composite spar to form wing structure having an expanded plastic foam core. Inasmuch as the foam core wing structure does not utilize spaced rib elements, the composite spar is separated along the central break groove to form separate T shaped components which are reassembled by having the web portions overlap or joined in an abutting manner as previously described.

The wing structures are connected to or through the fuselage by use of elongate spaced-apart connector elements which telescope respectively into the upper and lower hollow flange portions of the aluminum composite spar and into the corresponding hollow flange portions of an aluminum composite spar section transversely positioned across the fuselage so that the wings are symmetrically supported by and extend from the fuselage in the commonly accepted member.

A fuselage blade box assembly is transversely provided through the fuselage and is provided with a segment of the aluminum composite spar section so as to selectively receive the connector elements as previously described.

In the modified airplane kit or toy embodiment of the invention, the wings are secured to the sides of the fuselage by use of a rubber band connector which selectively engages oppositely positioned inwardly extending screw hook elements which are positioned on the respectively root rib elements on each wing so as to extend transversely into the fuselage area.

In another embodiment of the invention, spring lock assembly means are provided in association with the aforementioned fuselage blade box assembly and the wing spar elements. The spring lock means are configured to lockably engage the upper and lower connector elements inserted into the hollow flange members in contact therewith so as to prevent removal of the connector elements from engagement with the hollow flange portions of the composite spar section mounted in the fuselage blade box assembly and the wing structure.

None of the known prior art wing structures utilize an aluminum composite spar member such as that of applicant which has an I cross-sectional configuration comprised of a central web portion having opposed substantially rectangular hollow flange portions.

Further, none of the known prior art wing structures utilize an aluminum composite spar member such as that of applicant which is configured to make snap supportive engagement with front rib assemblies and rear supportive telescoping engagement with rear rib assemblies to form a wing structure.

None of the known prior art wing structures utilize an aluminum composite spar member that can selectively divide into elongate T-shaped components which can be reassembled to selectively form symmetrical and/or longitudinally tapered composite spar members for use in forming foam core wings.

None of the prior known art wing structures utilize an aluminum composite spar member which is uniquely adapted to cooperate with fuselage-mounted lock and support means to selectively receive and lockably maintain the wing structures in their operative use position on the fuselage.

It is therefore an object of this invention to provide a wing structure utilizing an aluminum composite spar member having great versatility in use and ease of assembly.

Another object of this member is to provide a wing structure utilizing an aluminum composite spar member which greatly shortens building time by eliminating lengthy spar cutting, laminating, rib assembly, box beams and the like which have heretofore constituted laborous and difficult time-consuming aircraft building steps and procedures.

Other objects and advantages found in the construction of the invention will be apparent from a consideration of the following specification in connection with the appended claims and the accompanying drawings.

IN THE DRAWINGS

FIG. 4 is a schematic side view of the separate components of the aluminum composite wing spar as configured to form an elongate longitudinally tapered wing spar structure.

FIG. 5 is a schematic view showing the separate components of the wing spar in their assembled overlap position to form an elongate longitudinally tapered wing spar structure.

FIG. 6 is a cross-sectional view of the assembled components of the aluminum composite wing spar taken on line 6—6 of FIG. 5.

FIG. 7 is a cross-sectional view of another embodiment of the aluminum wing spar showing the components assembled so that the central web portion of each component telescopes within the opposed component.

FIG. 8 is a partial schematic side view of another embodiment of the aluminum composite wing spar wherein the edges of the longitudinally tapered central web portions of the components are joined in an abutting position to form the longitudinally tapered spar.

FIG. 9 is a cross-sectional view of the assembled composite wing spar taken on line 9—9 of FIG. 8.

FIG. 10 is an enlarged end view of the preferred embodiment of the unitary aluminum composite spar showing the longitudinal snap groove portions and longitudinal grooves along the juncture points of the central web portion with the hollow flanges of the spar.

FIG. 11 is a schematic exploded perspective view showing one embodiment of the connector element means utilized for alignably connecting the wings to the fuselage.

SPECIFIC DESCRIPTION

Figure 1:
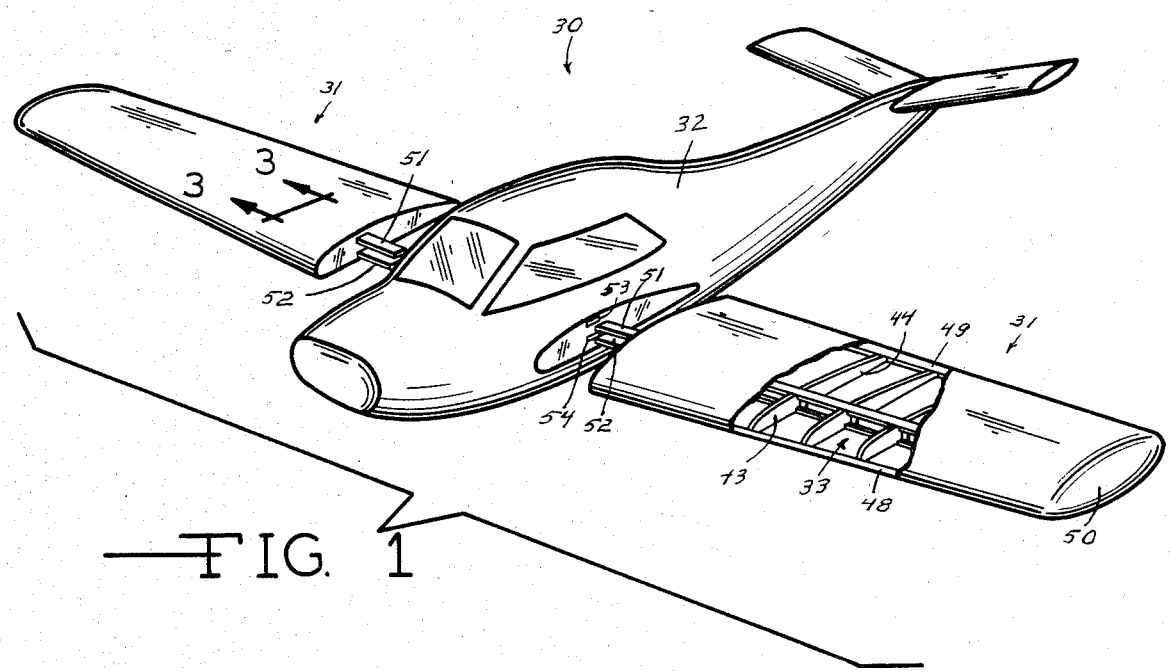
FIG. 1 is a perspective schematic exploded assembly view of an aircraft utilizing the aluminum composite spar wing structure.

As shown in the drawings and more specifically in FIG. 1, a model aircraft 30 is provided having a pair of aluminum composite spar wing structures 31 which are easily attached to the fuselage 32.

Figure 2:
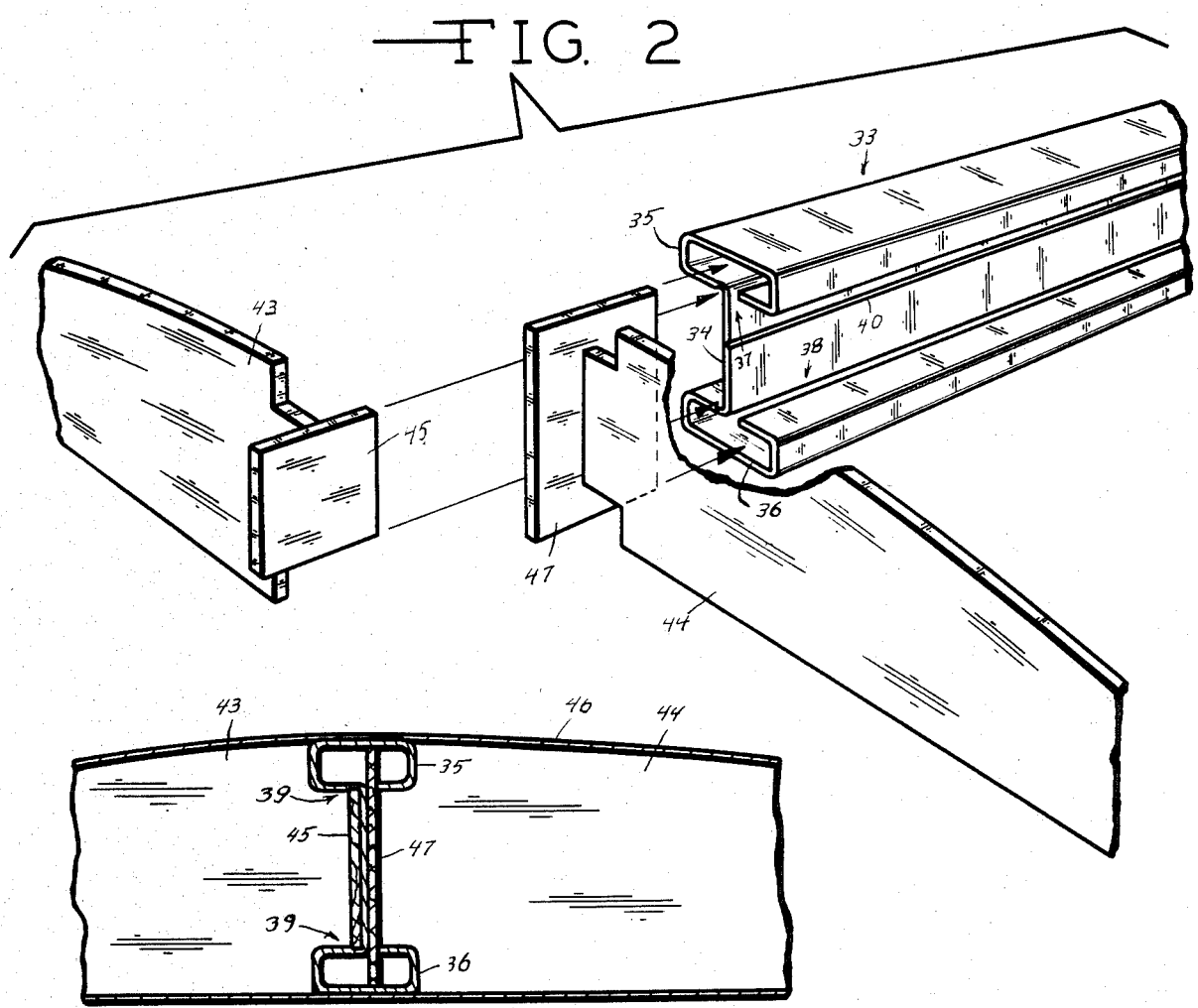
FIG. 2 is a partial perspective schematic exploded view of the aluminum composite spar having an overall I beam cross-sectional configuration and the traverse ribs utilized in association therewith.

In the preferred embodiment of the invention as shown generally in the drawings and more specifically in FIGS. 2 and 10, an elongate rolled aluminum spar 33 is provided which has a generally I cross-sectional configuration. More specifically, the rolled aluminum spar 33 configured to have a central web portion 34 and opposed upper and lower hollow flanges, 35 and 36, respectively. The upper and lower hollow flanges, 35 and 36, respectively, and are further configured to define elongate access slots, 37 and 38, respectively, between the edges thereof and the web portion 34. A pair of spaced-apart snap grooves 39 are provided along the junctures between the central web 34 and the upper and lower hollow flange portions, 35 and 36, respectively.

Figure 12:
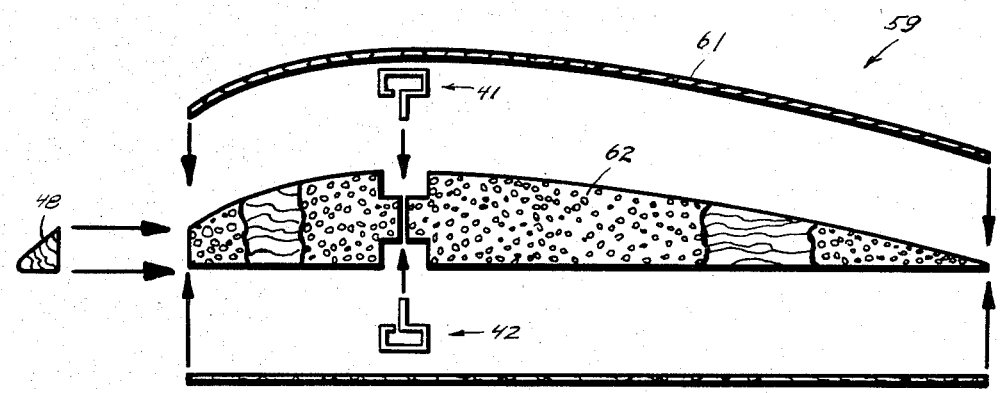
FIG. 12 is a schematic exploded cross-sectional view of another embodiment of the aluminum composite spar wing structure showing the use of a plastic foam core in conjunction with the composite spar to form the desired wing structure.
Figure 13:
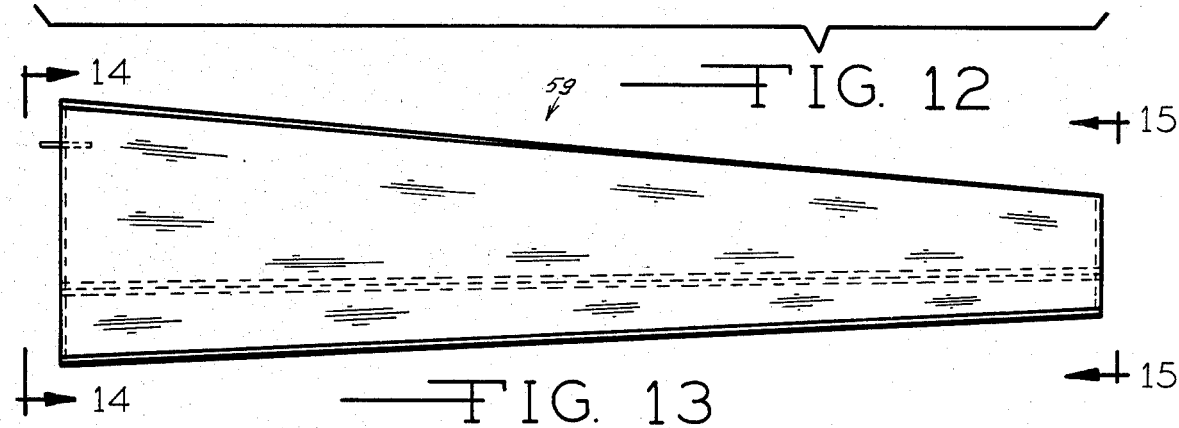
FIG. 13 is a top view of the foam core wing structure embodiment of the invention shown in FIG. 12.
Figure 14:
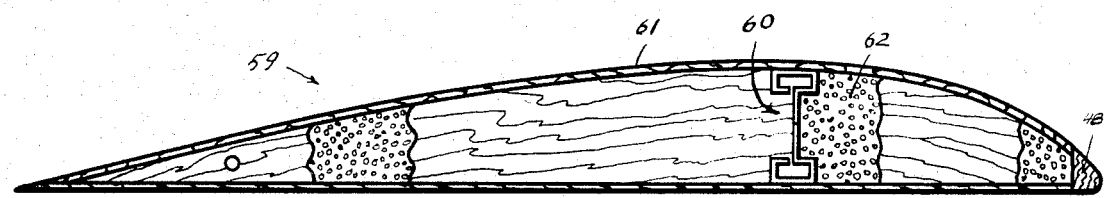
FIG. 14 is a cross-sectional view of the foam core wing structure embodiment of the invention taken on line 14—14 of FIG. 13.
Figure 15:
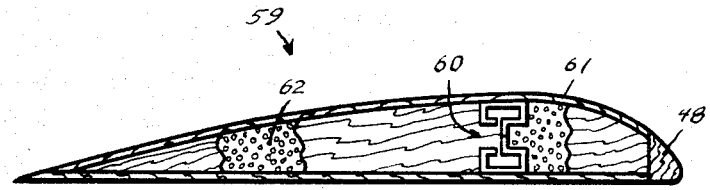
FIG. 15 is a cross-sectional view of the foam core wing structure embodiment of the invention taken on line 15—15 of FIG. 13.
Figure 16:
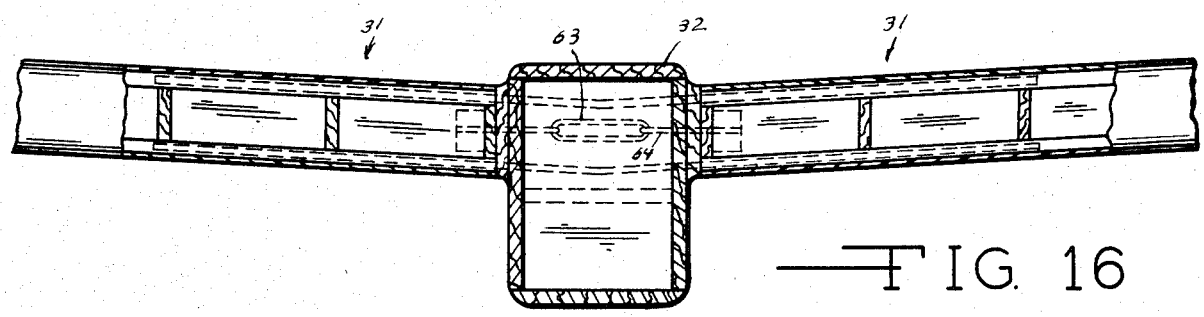
FIG. 16 is a schematic front cross-sectional view of another embodiment of the invention showing selected means for mounting the wings on the fuselage.
Figure 17:
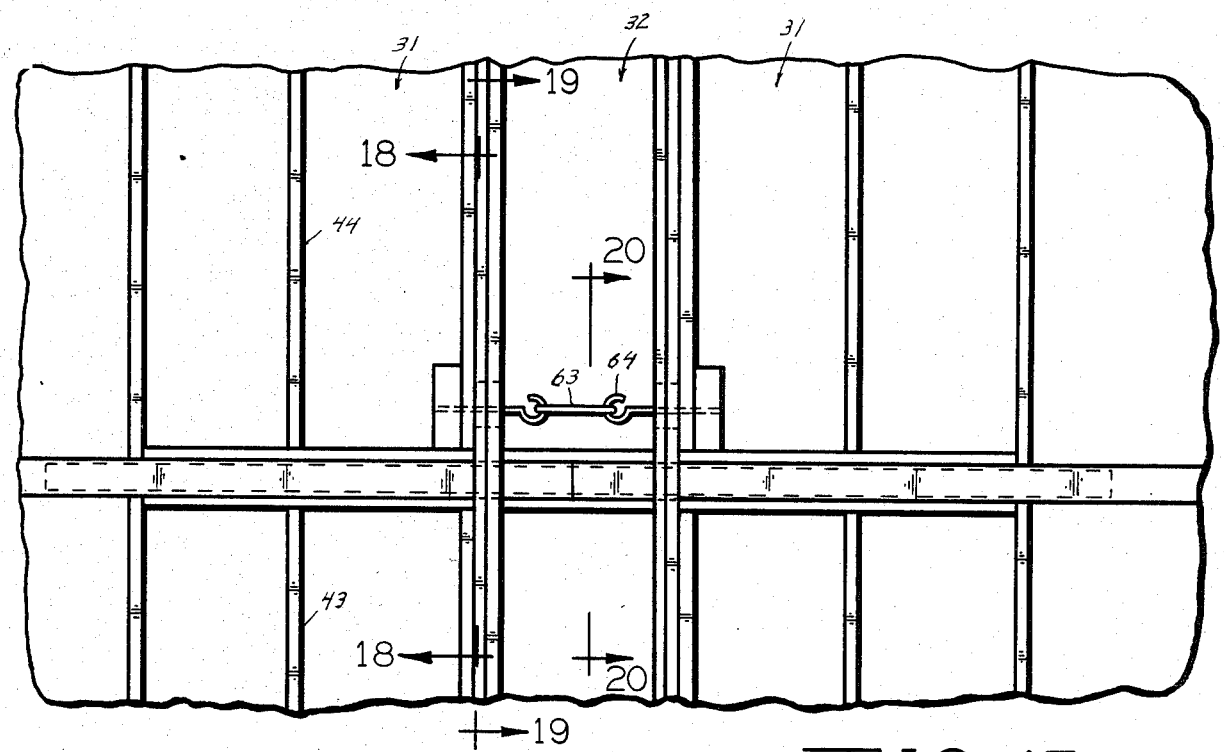
FIG. 17 is a partial schematic top view of the embodiment of the invention shown in FIG. 16.

An elongate centrally positioned break groove 40 can be selectively provided on either face of the central web portion 34 in order to facilitate snap separation of the aluminum spar 33 into two separate components 41 and 42 as will be hereinafter described and as shown in FIG. 12.

Although the preferred embodiment of the spar 33 is fabricated as a rolled aluminum structure, it is within the scope of the invention that the spar 33 be fabricated as an extruded plastic structure or by use of any other metal or construction material depending on the specific intended end use of the spar 33, i.e. as part of model airplane kit and/or as part of air recreational vehicles such as ultra-light aircraft, hang gliders, sail planes, small experimental aircraft, homebuilt aircraft and other aircraft as desired.

It is also within the scope of the invention that the wing spar 33 have a cross-sectional configuration comprising a central web 34 with integrally formed opposed hollow flange portions. Such hollow flange portions could have such cross-sectional configurations as circular, oval, triangular, square, rectangular or any other desired cross-sectional configuration and with or without the snap grooves 39 and/or the slots 37 and 38.

Figure 3:
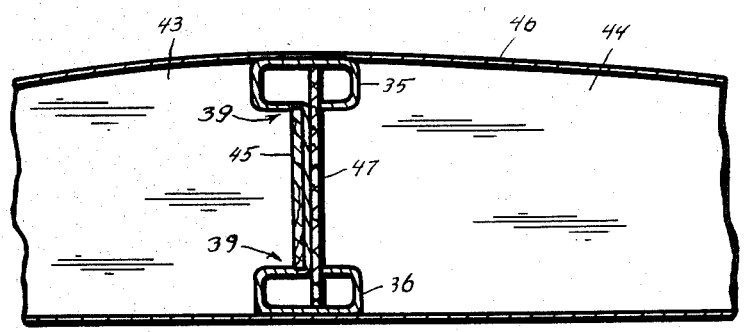
FIG. 3 is a cross-sectional view of the assembled aluminum composite spar wing structure taken on line 3—3 of FIG. 1.

As shown generally in the drawings and more particularly in FIGS. 1, 2 and 3 thereof, the composite spar wing structure 31 is fabricated by use of a plurality of spaced-apart front and rear ribs, 43 and 44, respectively, which are adapted for easy engagement with the spar 33. Each of the front ribs 43 is provided with a front rib plate 45 which is adapted to make snap engagement with the snap grooves 39 so as to be in abutting engagement with the forward face of the web portion 34 of the spar 33. Thus positioned, the front ribs 33 cooperate with the spar 33 and an associated cover sheet 46 to form the airfoil configuration of the wing structure 31.

Each of the rear ribs 44 is provided with a rear rib plate 47 which is adapted to make sliding engagement with the spar 33 by selective movement into and along the access slots 37 and 38 defined by the spar 33. Thus positioned, the rear ribs 34 cooperate with the spar 33 and associated cover sheet 46 to form the rear airfoil configuration of the wing structure 31.

Although not critical to this invention, the remainder of the wing structure 31 is completed by use of leading edge 48, trailing edge 49 and end panel assemblies 50 that are well known in the art and will not be described in detail herein.

If a model aircraft kit is being assembled, the foregoing components are generally fabricated from balsa and spruce wood and are generally secured in their operative use assembled positions by appropriate glues and/or resins. If the end structure is an ultra-light, experimental, or homebuilt aircraft, the components may be fabricated from structural plastics or suitable metals and can be maintained in their operative use assembled positions by use of high-strength glues, resins, welding, and/or riveting procedures that are well known in the art and which will not be discussed here.

As shown generally in the drawings and more particularly in FIGS. 1 and 11, the wings 31 are secured in their operative use position on the fuselage 32 by use of connector elements 51 and 52 which are configured to selectively telescope into the corresponding upper and lower hollow flanges 35 and 36 of the wing spar 33 and the corresponding openings 53 and 54 provided through the fuselage 32. A corresponding composite I beam structure section 55 can be selectively provided in the fuselage in end-to-end alignment with the spars 33 of the wing structures so as to retentively engage the connector elements 51 and 52.

Figure 21:
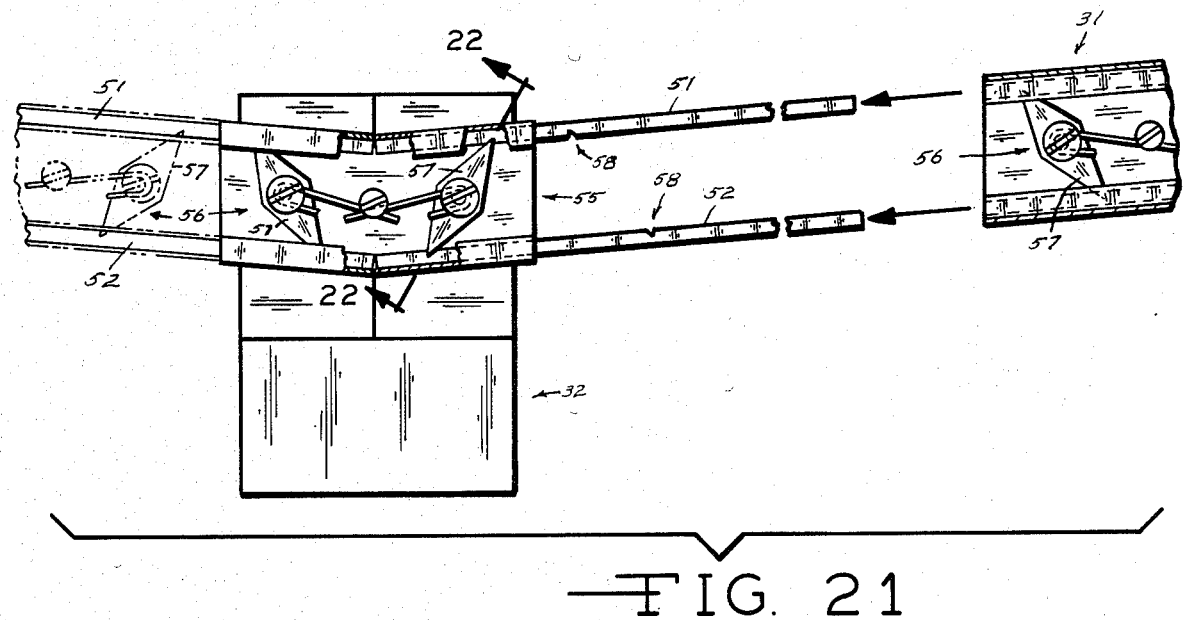
FIG. 21 is a partial schematic front elevational view of another embodiment of the invention showing the wing spar and fuselage mounted connector element spring lock means assemblies.
Figure 22:
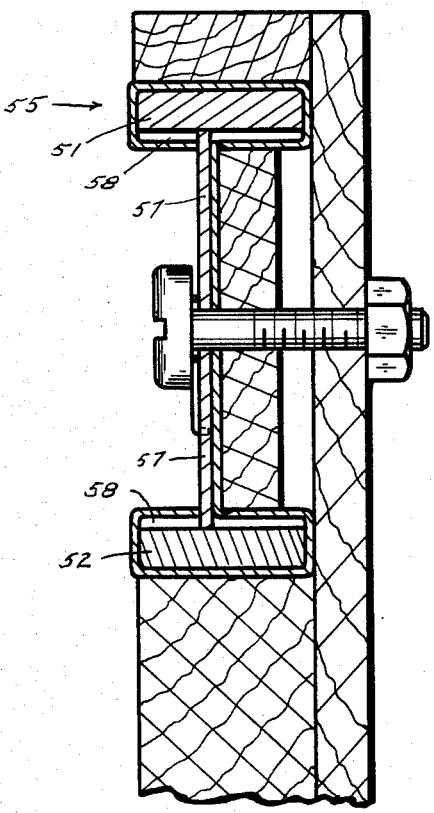
FIG. 22 is a partial schematic cross-sectional view of the spring lock means assembly taken on line 22—22 of FIG. 21.

While the connector elements 51 and 52 can be secured in their telescoped end use position with the wing spar and fuselage by use of glue or other securing means, it is within the scope of the invention to provide spring-biased lock assemblies 56 in association therewith. As shown in FIG. 21, corresponding spring-biased lock assemblies 56 are provided in association with the corresponding fuselage I beam section 55 and the wing spars 33, respectively. As indicated, each end of the spring biased pawl 57 is adapted to lockably retain the corresponding connector elements 51 and 52, respectively, inserted into the hollow flanges 35 and 36, respectively. The edges of the pawl 57 are configured to lockably engage transverse slots 58 provided in the surfaces of the connector elements 51 and 52. Thus engaged, the connector elements 51 and 52 cannot be removed or accidently dislodged from the hollow flange into which they have been inserted. This interrlationship is shown in FIG. 22.

Another embodiment or end use of the modified composite wing spar 33 consists of its use in the foam wing structure 59 shown in FIGS. 12 through 15. In order to adapt the wing spar 33 for use in forming the foam wing, it is snapped into two components 41 and 42, respectively, as previously described. Thereafter, the components are joined along the web portions thereof to form a composite wing spar 60 as shown in FIGS. 9 and 12 through 15. If a longitudinally tapered wing spar is desired the webs of the components 41 and 42 are diagonally cut to remove the portions of the webs as shown in FIG. 4. The components can then be longitudinally telescoped together as shown in FIGS. 5 through 7 or butt-joined as shown in FIG. 9.

After the modified wing spar 60 has been fabricated as described above, the foam wing is formed therearound in accordance with known construction methods. The wing is then completed to the configuration shown in FIGS. 14 and 15 using any desired sheet cover 61. As shown, the foam material 62 flows around and completely encases the modified spar 60 to form a unitary foam wing structure 59 having versatility in use and embodying ease of construction.

The sheet cover 61 can be fabricated from any desired materials, such as wood, fabric, plastic, metal and the like. Further, the use of a separate sheet cover can be eliminated by use of plastic foam material which forms its own integral outside cover surface upon hardening or self-curing. Such foams are well known in the art and will not be discussed herein.

Figure 18:
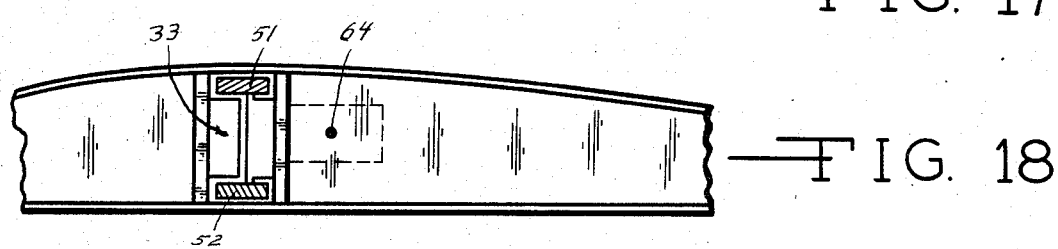
FIG. 18 is a partial schematic cross-sectional view taken on line 18—18 of FIG. 17.
Figure 19:
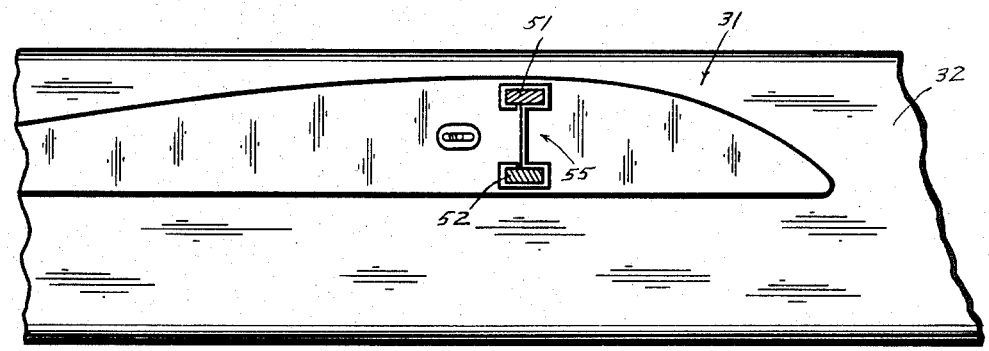
FIG. 19 is a partial schematic cross-sectional view taken on line 19—19 of FIG. 17.
Figure 20:
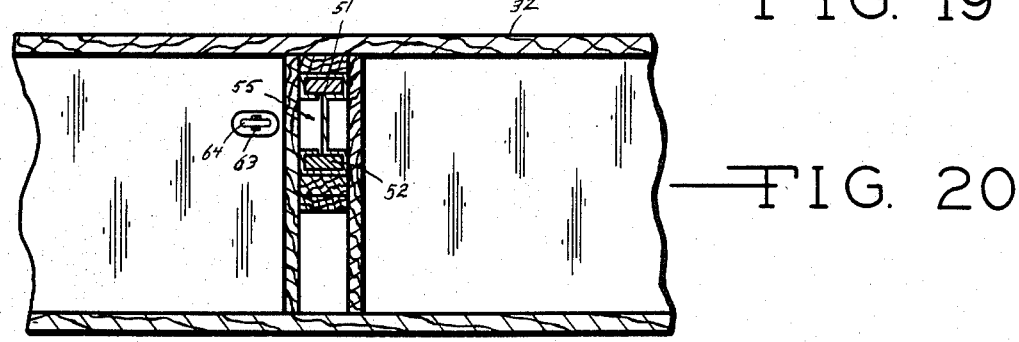
FIG. 20 is a partial schematic cross-sectional view taken on line 20—20 of FIG. 17.

In model airplane kit applications, the composite spar wings 33 can be retained in their operative use position against the sides of the fuselage 32 by use of a well known prior art method which consists of using a rubber band 63 to join screw-hooks 64 positioned in the wing structures 31. The cross-sectional views of FIGS. 18 through 20 further illustrate the use of the connector elements 51 and 52 in association with the composite I beam spar 33 used in the wings 31 and the fuselage 32 to align and maintain the wings 31 in their operative use position in relation to the fuselage 32. The method and structure used in permanently joining the wings to the fuselage could be varied as desired depending on the particular aircraft application involved. Such connecting or joining methods and structures are well known in the art and will not be described herein.

In summary, a composite wing spar assembly is provided comprising an elongate wing spar having a substantially I cross-sectional configuration. The wing spar is configured to define a central web portion having a pair of opposed hollow flange members provided therealong. The hollow flange portions are adapted to receive connector elements thereinto. A pair of opposed longitudinal snap grooves can be selectively provided along the junctures of the hollow flange members with the central web portion. The wing spar can also be selectively configured to define a pair of opposed elongate longitudinal slots along the junctures of the hollow flange members with the central web portion. A central elongate longitudinal break groove can also be selectively provided along the central web portion so as to permit selective division of the wing spar into two separate longitudinal T-shaped components. A composite spar wing structure assembly is provided comprising an elongate wing spar having a substantially I cross-sectional configuration. The wing spar is configured to define a central web portion having a pair of opposed hollow flange members provided therealong. The wing spar is configured to make selective snap-engagement with front rib-plates of spaced-apart front ribs positioned along the front of the wing spar. The wing spar is also configured to define a pair of opposed longitudinal slots at the junctures between the hollow flange members and the central web portion. The longitudinal slots are adapted to slidably receive rear rib-plates of spaced-apart rear ribs positioned along the rear of the spar. A plurality of spaced-apart front ribs are positioned along the front of the wing spar. The front ribs are provided with front rib-plates which are adapted to make snap engagement with the wing spar between the hollow flange members. A plurality of spaced-apart rear ribs are selectively positioned along the rear of the wing spar. The rear ribs are provided with rear rib-plates which are adapted to make sliding engagement with the longitudinal slots so as to maintain the rear ribs in a spaced-apart relationship along the rear of the wing spar. A sheet cover is provided in association with wing spar and the ribs to define the wing structure airfoil.

A composite wing spar assembly is provided which is adapted for use in fabricating a longitudinally tapered foam wing structure. The wing spar is comprised of a pair of opposed elongate wing spar components. Each of the wing spar components is configured to define a longitudinal hollow flange portion having a longitudinal correspondingly tapered web portion extending therefrom. The wing spar components are adapted to be abuttingly joined along the correspondingly tapered web portions so as to maintain the hollow flange members in a spaced-apart opposed tapered relationship so as to provide a unitary composite wing spar adapted for use in fabricating longitudinally tapered foam wing structures.

A composite spar foam wing structure assembly is provided which comprises an elongate longitudinally tapered composite wing spar having a substantially I cross-sectional configuration. The tapered wing spar is configured to define a tapered central web portion having a pair of opposed hollow flange portions. A foam body wing portion is provided which is configured to encase and be supported by the longitudinally tapered composite wing spar. A composite spar wing structure aircraft assembly is provided which comprises a pair of opposed spaced-apart wing structures. Each of the wing structures is provided with a wing spar therethrough. Each wing spar is configured to define a central web portion provided with a pair of opposed spaced-apart hollow wing flange portions. A fuselage is provided having a spar section transversely mounted therethrough. The spar section is configured to define a pair of opposed fuselage hollow flange portions in aligned register with the corresponding wing hollow flange portions. Connector elements are provided which are adapted to telescopingly engage the fuselage hollow flange portions and the wing hollow flange portions so as to maintain said wing structures in their operative use position on the fuselage.

A plurality of spring-biased lock assemblies are provided in association with the spar members. The lock assemblies are provided with spring-biased pawl members which are adapted to lockably engage the connector elements inserted into the corresponding fuselage flange portions and the corresponding wing flange portions.

It is thus seen that a unique aluminum composite spar wing structure assembly is provided which has versatility in use and which provides ease of assembly by eliminating time-consuming and tedious construction steps heretofore found in the construction of model aircraft by use of methods and structures of the prior known art. Further, the instant invention finds applicability in the construction of air recreational vehicles such as ultralight aircraft, hang gliders, sail planes, small experimental aircraft, homebuilt aircraft and other aircraft as desired.

Various other modifications of the invention may be made without departing from the principal thereof. Each of the modifications is to be considered as included in the hereinafter appended claims, unless these claims by their language expressly provide otherwise.

I claim:

1. In a composite spar wing structure assembly comprising:
    an elongate wing spar having a substantially I cross-sectional configuration, said wing spar defining a central web portion having a pair of opposed hollow flange members provided therealong, said wing spar configured to make snap-engagement with front rib-plates of spaced-apart front ribs positioned along the front of said wing spar, said wing spar defining a pair of opposed longitudinal access slots at the junctures between each of said hollow flange members and said central web portion, said longitudinal access slots adapted to slidably receive rear rib-plates of spaced-apart rear ribs positioned along the rear of the said spar;
    a plurality of said spaced-apart front ribs positioned along the front of said wing spar, said front ribs provided with said front rib-plates which are adapted to make snap engagement with said wing spar between said hollow flange members; and
    a plurality of said spaced-apart rear ribs positioned along the rear of said wing spar, said rear ribs provided with said rear rib-plates which are adapted to make sliding engagement with said longitudinal access slots so as to maintain said rear ribs in a spaced-apart relationship along the rear of said wing spar.

2. In the composite wing spar assembly of claim 1 wherein a central elongate longitudinal break groove is selectively provided along said central web portion.

3. In the composite spar wing structure assembly of claim 1 wherein:
    a fuselage is provided having a spar section transversely mounted therethrough, said spar section having a pair of opposed fuselage hollow flange portions being in aligned register with said corresponding wing hollow flange portions provided on said wing spar positioned adjacent thereto; and
    connector elements adapted to telescopingly engage said fuselage hollow flange portions and said wing hollow flange portions so as to maintain said wing structures in their operative use position on said fuselage.

4. In the aircraft assembly of claim 3 wherein a plurality of spring-biased lock assemblies are provided in association with said spars, said lock assemblies having spring-biased pawl members adapted to lockably engage said connector elements inserted in said corresponding fuselage flange portions and said corresponding wing flange portions.

* * * * *